H. A. HOGEL.
METHOD OF TREATING ORES.
APPLICATION FILED JULY 27, 1905. RENEWED NOV. 23, 1908.
927,046.
Patented July 6, 1909.
4 SHEETS—SHEET 1.
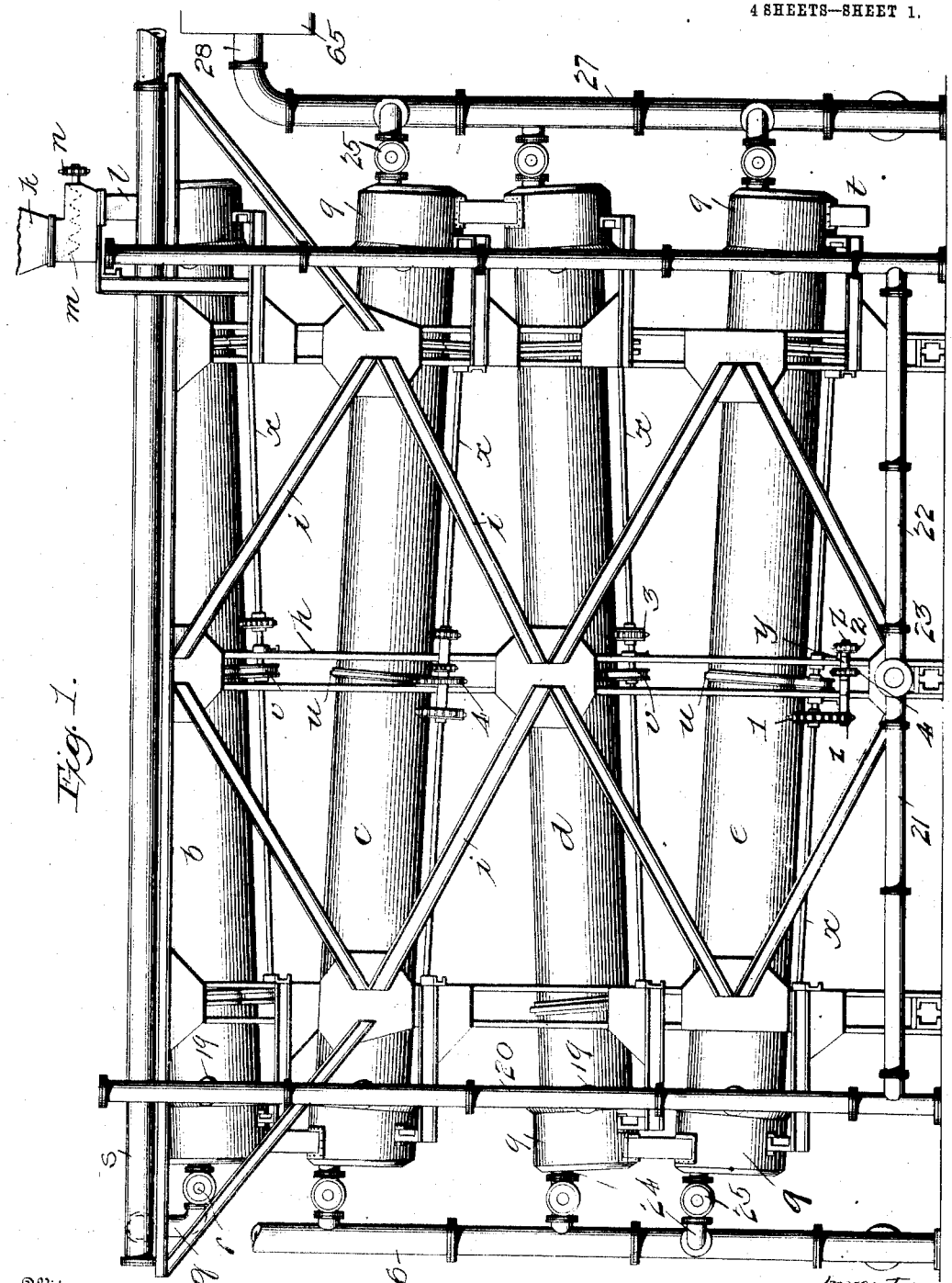

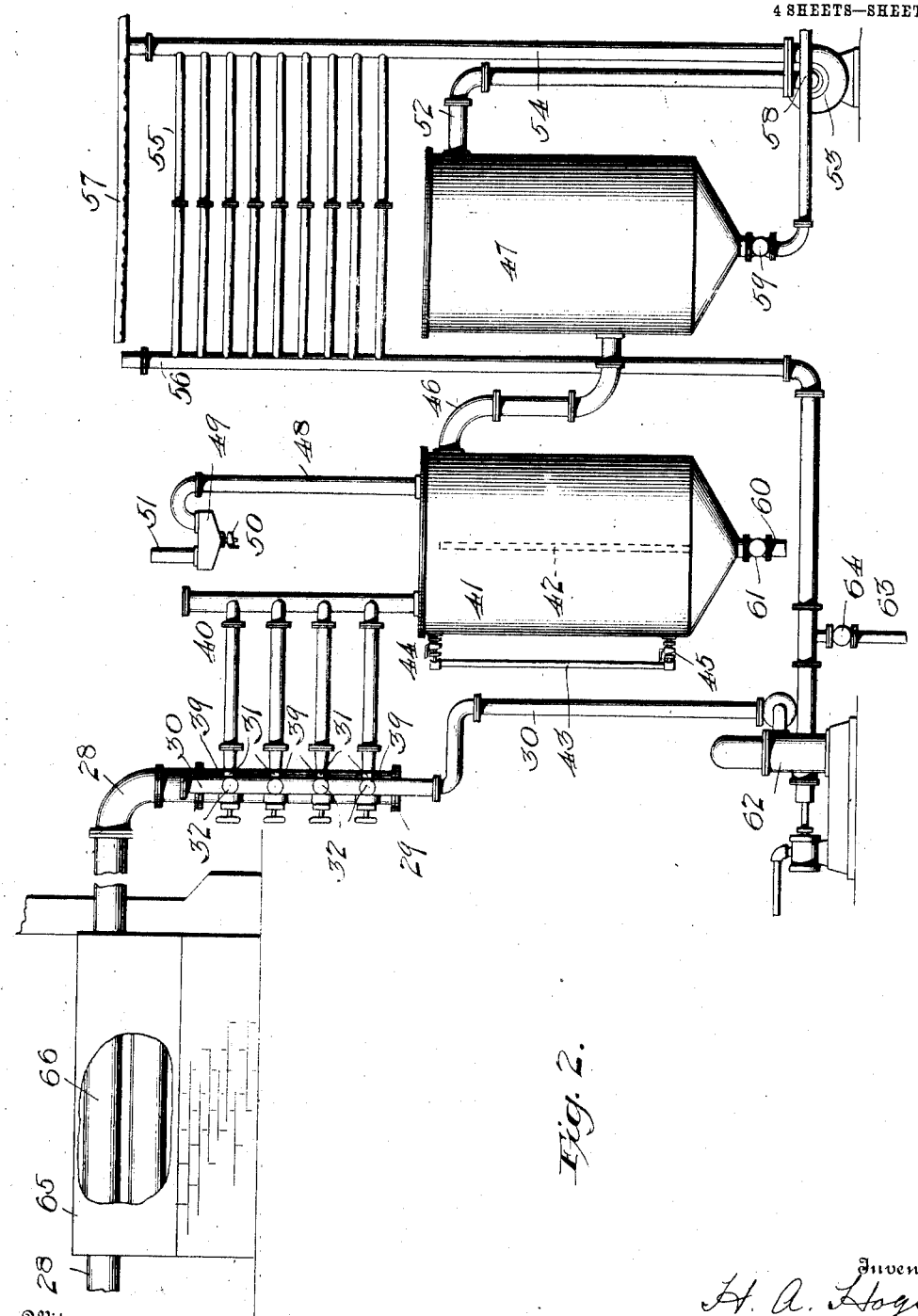

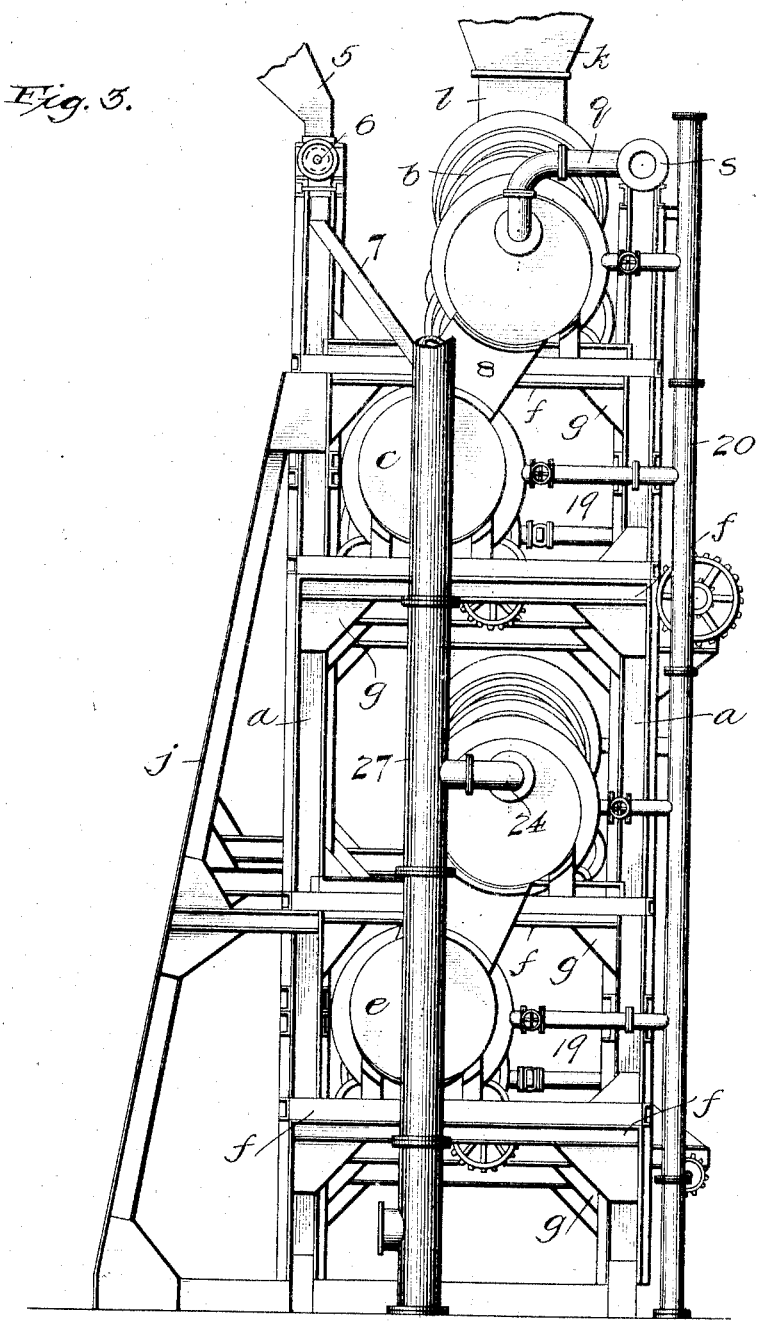

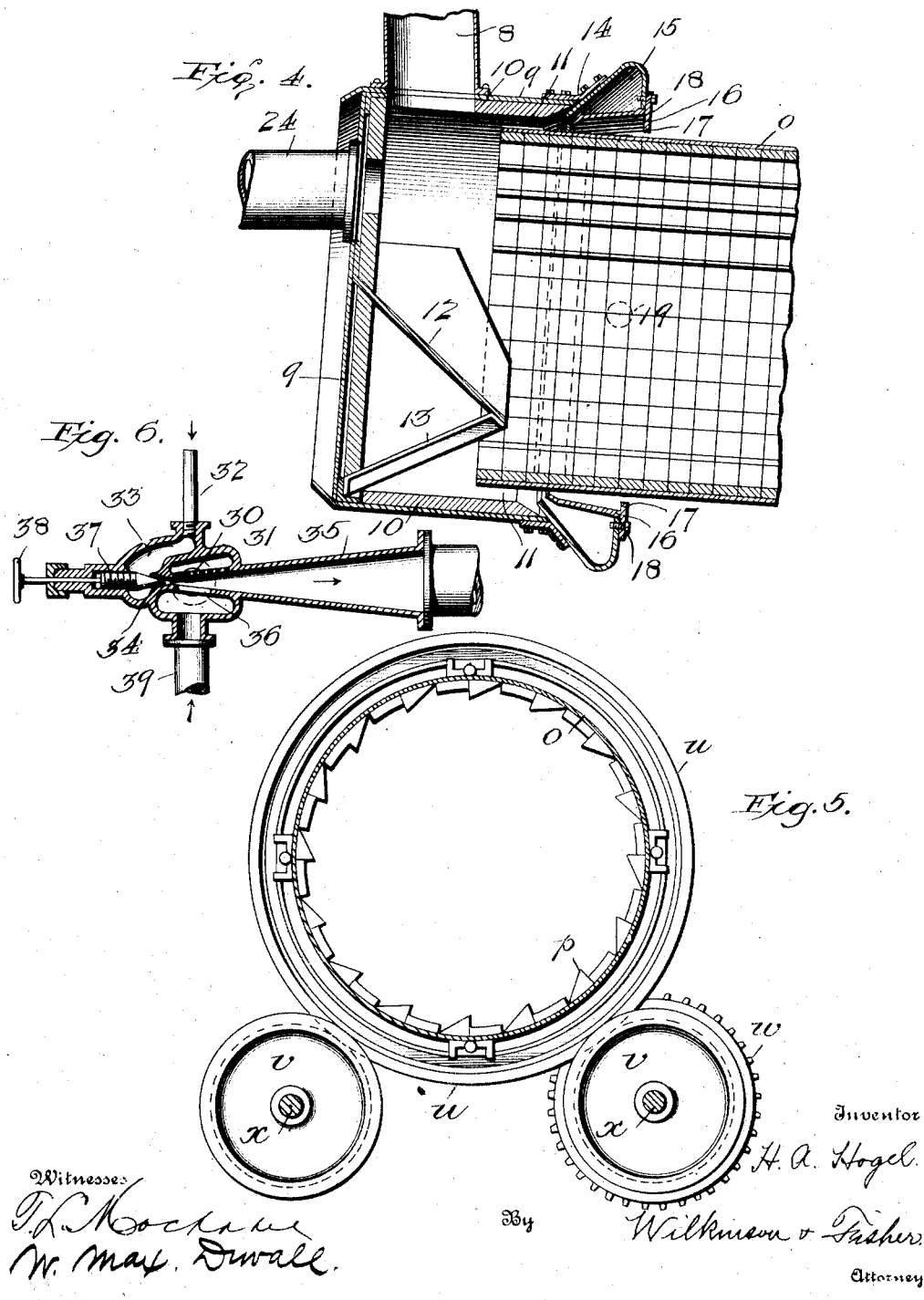

UNITED STATES PATENT OFFICE.

HASCAL A. HOGEL, OF NEW YORK, N. Y.

METHOD OF TREATING ORES.

No. 927,046.

Specification of Letters Patent.

Patented July 6, 1909.

Application filed July 27, 1905, Serial No. 271,459. Renewed November 23, 1908. Serial No. 464,080.

*To all whom it may concern:*

Be it known that I, HASCAL A. HOGEL, a citizen of the United States, residing at New York, in the county of New York and State of New York, have invented certain new and useful Improvements in Methods of Treating Ores, and do hereby declare the following to be a full, clear, and exact description of the invention, such as will enable others skilled in the art to which it appertains to make and use the same.

My invention relates to improvements in method of treating ores, and is primarily designed to treat refractory sulfid ores, more especially those containing sulfids of iron, lead, silver, and gold, although it is not restricted to such ores, as any ore, no matter how complex and refractory, can be successfully treated by my process and practically all of the valuable constituents thereof separated from each other and saved.

My process depends upon the action of heat, sulfur, oxygen and salt, as hereinafter described, upon the ores and contemplates the production of chlorids of some of the metals contained in the ore, the volatilization of the chlorids so formed and the condensation, separation and recovery of these chlorids, the gold being recovered as the pure metal, the silver as solid chlorid of silver, the copper in solution as a chlorid or sulfate and the lead as solid sulfate of lead, the last compounds named being easily reducible, producing the pure metals, silver, copper and lead.

It is well known that many chlorids can be quite easily volatilized by the proper amount of heat and many attempts have been made to utilize this fact to recover metals from refractory ores, but, so far as I know, all these efforts have been either practical failures, when attempted to be carried out on a commercial scale, or else attended with so much expense as to be prohibited from use. One reason for these failures, and the chief one, in my opinion, was the impossibility of obtaining suitable and economical methods and apparatus for condensing the volatilized fumes and by my present invention this point is carefully provided for.

In the accompanying drawings, which illustrate one form of apparatus for carrying out my improved method:—Figure 1 is a side elevation of the furnace end of my apparatus. Fig. 2 is a side view of my condensing apparatus. Fig. 3 is an end view of the parts shown in Fig. 1, looking from the left of this figure. Fig. 4 is a section of one of the furnace ends, parts being broken away. Fig. 5 is a cross section of one of the furnaces, and Fig. 6 is an enlarged horizontal section of one of the aspirators.

In a strong frame, preferably made of iron or steel, are mounted any desired number of furnaces $b$, $c$, $d$, and $e$, four being shown on the drawing. This frame is composed of upright end posts $a$, cross beams $f$, with corner braces $g$ between said posts and beams, center posts $h$, and diagonal braces $i$, the whole forming a rigid structure in which the furnaces and other parts are located. In Fig. 3 inclined side bracing beams $j$ are shown on one side of the main frame and these may be used on both sides of said frame, if desired. The various pipes, hoppers, driving devices, &c. are supported in or on said frame or extensions thereof.

$k$ represents a hopper into which the ground raw ore is fed. From the bottom of this hopper the ore is fed along by the spiral conveyer $m$, driven by a belt or sprocket chain passing over the pulley or wheel $n$, and then drops through the pipe $l$ into the higher end of the upper inclined furnace, where it is roasted, the spiral conveyer, packed with fine ore, acting as a stop to prevent the gases from passing out through the hopper. The ore is finely pulverized before it is fed into the hopper $k$, preferably so that it will pass through a 40 mesh sieve.

Each of the furnaces is composed of a shell $o$, made of iron or steel, composed of sections bolted together, Fig. 5, and lined with a fire brick construction, alternate rows being the ordinary curved fire brick and the intermediate rows being nearly triangular in cross section, as shown at $p$ in Fig. 5, which serve as shelves to lift the ore from whence it is spilled down to the bottom of the furnace, thus insuring a thorough stirring of the ore.

In the furnace b the ore is roasted, to drive off the larger part of the sulfur, incidentally forming a small percentage of sulfates of some of the metals present. I do not attempt, however, to carry this roasting operation to a "dead roast", for in such a case, it would be necessary to add more sulfur as a small percentage of sulfur is needed to perfectly carry out my method.

To one end of the furnace b is attached a discharge pipe q, provided with a valve r, which pipe leads into a pipe s supported on the top of the main frame, which pipe leads away the sulfurous acid gas to a sulfuric acid plant (not shown) in which this gas is saved.

The furnaces b, c, d, e are similar in structure but are inclined in opposite directions, Fig. 1, and located in opposite angles of the main frame, Fig. 3, and as they are all continuously revolved, the ore slowly travels from the hopper k back and forth through the furnaces until it is finally discharged through the pipe t, which is preferably provided with a screw conveyer (not shown) or similar device, to prevent any of the volatilized material from escaping therethrough and going to waste, though this is not absolutely necessary. Each furnace is provided with a plurality of flanges u, Fig. 5, each of which rests in two grooved rollers v. Each furnace may be provided with the usual rack, with which a gear wheel, such as w, engages, or it may be revolved by turning one of the rollers v. These rollers and wheels are all mounted on inclined shafts, such as x, to correspond with the inclination of the respective furnaces. Any suitable means for rotating these furnaces may be used. I have shown, for the lower two furnaces d and e, a shaft y, mounted in one of the posts h and having a gear wheel z, which meshes with the gear wheel 1 on the shaft which rotates the furnace e, a sprocket wheel 2, connected by a sprocket chain (not shown) with the sprocket wheel 3 on the driving shaft for the furnace d, and a sprocket wheel 4, which is driven by a sprocket chain (not shown) from a point some distance from the main frame. The means shown for rotating the furnaces b and c are similar in structure.

Into the upper end of the furnace c salt is delivered, by means of the hopper 5, screw conveyer 6 and pipe 7, similar in structure to the corresponding parts already described. Instead, however, of using the furnace b as a roasting furnace, I may use it as a volatilizing furnace, if desired, like the furnaces c, d and e, the roasting being done in a separate, detached furnace, in which case the ground and roasted ore, mixed with the proper percentage of salt, would be fed into the hopper k and the hopper 5 dispensed with.

From the discharge end of the furnace b the roasted ore is delivered through the inclined pipe 8 into the receiving end of the furnace c, being mixed with salt, as it enters. In this furnace c, the formation of volatile chlorids begins and under the action of heat, sulfur, salt and oxygen (air being blown into the furnace, as hereinafter described) the reactions take place which eventually turn practically all the gold, silver, lead, and copper present into chlorids, which are volatilized. Some small part of the lead and copper goes over into the condenser as sulfates and sulfurous and sulfuric acids are also formed in small quantities, all of which, together with the volatile chlorids go over into the condenser.

Any suitable means for heating the furnaces may be employed. It is desirable though not strictly necessary to provide the furnaces with a protective covering, to prevent the iron shells from being too much affected by the heat. To heat the furnaces, they may be incased in a brick structure built around and inside of the main frame, suitable openings being provided for the pipes, driving means, hopper pipes, &c. A heating furnace is connected with this structure and the hot gases led into the base thereof whence they rise, mostly in a zigzag line, owing to the location of the furnaces and are discharged through a suitable flue or flues into a chimney. For the sake of clearness, however, the heating means is not shown.

Each of the furnaces is revoluble but the ends thereof are stationary, one of these ends (an inlet end) being shown in detail in Fig. 4. It consists of a metal cylinder 9, closed at one end and provided with a lining 10 of fire brick or other refractory material. It is also provided with an inclined shelf 12, to conduct the ore, falling from the furnace next above it, well into the end of the furnace. A brace 13 holds this shelf firmly. The furnace does not touch the end or cap 9 but is separated from it by an annular space 11 and to prevent any volatile material from escaping through this space, instead of going over into the condenser, a steady current of air or oxygen is blown through this annular space, supplying the oxygen needed for the chemical reactions, preventing the volatile material from escaping and going to waste and creating a slight air pressure in the furnace, which aids in forcing the volatilized material into the condenser. To effect these results an annular, flaring flange 14 is bolted onto the open end of the end or cap 9 and to this flange is bolted a curved annular piece 15, to which in turn is bolted the annular piece 16, the parts 15 and 16 being brought nearly together at their free edges, thus forming an annular tube provided with a narrow annular delivery slot, Fig. 4. The part 16 is provided with an annular flange 17, which comes close to, but not in contact with, the shell of the furnace and with a shoulder 18 with which one edge of the piece 15 engages. The annular tube thus formed is connected by a pipe 19 with a pressure pipe 20, one of these pipes being located near each end of the main frame, these pressure pipes being, respectively, connected by pipes 21 and 22 to a pipe 23 which delivers compressed air to the apparatus.

From each end of each of the volatilizing furnaces c, d, and e leads a pipe, such as 24, provided with a valve, as 25, into a pipe, as 26 or 27, at either end of the furnaces. (Many of the parts referred to throughout the specification being duplicated, only one of them has, as a usual thing been described.) The pipes 26 and 27 deliver into the receiving pipe 28 of the condensing apparatus, Fig. 2. This pipe, however, is interrupted by an interposed boiler 65, having tubes 66. The volatilized fumes, which are highly heated, often as high as 1800° F. or more, are used to generate steam, which may be used as a source of power for any desired purpose, such as rotating the furnaces. This preliminary cooling, in the boiler 65, which cooling, however, must not be allowed to proceed far enough to permit condensation of the fumes in the boiler, also lightens the work of the rest of the condensing apparatus. The part of the pipe 28 which emerges from the boiler 65 is bent downward and closed at its lower end. Parallel to and in front of this downwardly bent portion of the pipe 28 is a smaller pipe 30, which pipe passes through a number of aspirators 31. These aspirators are shown in horizontal section in Fig. 6 and are of the type described in my former patent, No. 671,380. Air under pressure is forced in through the pipe 32 into the space 34 into a gradually expanding throat 35, which throat is provided inside the case of the aspirator with numerous perforations 36. The opening 34 is controlled by means of the needle valve 37 operated by a handle 38. Each aspirator casing is connected with the pipe 28 by a cross pipe 39. The effect of the swiftly rushing current of air through the opening 34 and throat 35 is to entrain along with it the volatilized materials which are delivered from the pipe 28 and also draw up the liquid which is in the pipe 30, as hereinafter described, and which is connected to the aspirator casing. In Fig. 2, I have shown four of these aspirators, although any desired number may be used. The effect of these aspirators is to cause a partial vacuum in the pipe 28, which aids in the ready discharge of the volatilized material from the furnaces, this operation being also aided by the air pressure in said furnace, as already described.

The throats 35 of the aspirators connect with a vertical pipe 40 closed at the top and running into the top of a condensing vessel 41 which is provided with a partition 42 which reaches to the top and nearly to the bottom thereof. Under the influence of the currents produced by the aspirators, the liquid flows up through the pipe 30, mingles with the volatilized materials coming over through the pipe 28, and is discharged into the condenser 41 which is usually kept pretty nearly full of liquid. The condenser 41 is provided with the usual gage glass 43 connected by valved pipes 44 and 45 with the body of the condenser. The liquid from the pipe 40 charged with the volatilized material and also with air passes down under the partition 41 and up again to the discharge pipe 46 which is connected with a second condensing cylinder 47.

In order to permit the excess of air which comes down through the pipe 40 to escape, I provide an upwardly extending pipe 48 which runs into a casing 49 provided with a stop cock 50 and escape pipe 51. In the casing 49, the pipe 48 dips below the surface of the water contained therein, thus affording a water seal which permits the air to escape freely but prevents a return movement of air through the pipe 48.

The vessel or tank 47 is provided with a discharge pipe 52 which is connected with a rotary or centrifugal pump 53, although any desired type of pump may be used. The liquid is forced by the pump 53 up through the pipe 54 which is closed at the top, and then across through a number of pipes 55 into the pipe 56 which is also closed at the top. While passing through the pipes 55, liquid is cooled by means of a shower of water discharged through perforations in the pipe 57 which runs above and parallel to the pipes 55, like an ordinary beer cooler. The liquid then passes from the pipe 56 into the pump 62 and back again into the pipe 30. The repeated circulation of the liquid through the condensing apparatus is for the purpose of more completely saturating it, for example, with the soluble chlorid and sulfate of copper.

When the apparatus begins to run, the first portion of the liquid is of course a very dilute solution—so dilute that it would hardly pay to treat it, but after the liquid has been more thoroughly saturated, it reaches a point where it may profitably be treated. The liquid is then drawn out through the pipe 63 provided with a valve 64 from the pipe 56. Through the pipe 58 provided with a valve 59 at the bottom of the tank 47 is discharged a deposit of solid chlorid of silver and a solid chlorid and sulfate of lead. These precipitates are then separated from the liquor that passes over with them in any suitable way, and the liquid is mixed with the liquor which is discharged through the pipe 63. This liquor is then treated in the usual way, as by electrolysis or the insertion of iron therein, to recover the copper. The metallic silver is recovered from the chlorid of silver in the usual way, as by treatment with zinc, and the lead is smelted, producing metallic lead, which usually carries a greater or less percentage of silver and gold which are recovered in the usual way. The gold is recovered in the metallic state for the reason that the compounds of gold which are formed in the operation, namely, the chlorid and a small proportion of the sulfid, are very easily decomposed, so that the gold is recovered from the condensing apparatus as a metal. Some of the gold settles in the bottom of the tank 41 which is therefore provided with a discharge pipe 60 having a stop cock 61. Some of it goes over into the second tank 47 and is discharged through the pipe 58, being separated from the lead and silver compounds in the usual way. It will thus be seen that practically all the lead, copper, gold and silver that is volatilized in the furnace part of my apparatus is condensed and collected in the condensing end thereof, the result being the saving of practically all of these metals at a slight expense. If the ore contains zinc, this may be practically eliminated during the roasting operation and the zinc may be recovered or may be thrown away, as circumstances dictate. The iron, which is discharged through the pipe $t$ at the end of the lowest furnace $e$, is either fine metallic iron or else a magnetic oxid. Both of these can be readily separated from the gangue and waste by a magnetic separator, and the iron can then be recovered as metallic iron in the usual way. Many ores, however, contain too small percentages of iron and zinc to warrant the saving of these metals, especially in localities where labor, fuel, etc. are high, as is the case in many sections where these complex refractory sulfid ores occur. The iron and zinc are therefore either saved or thrown away, as circumstances dictate.

Having thus described my invention, what I claim as new and desire to secure by Letters Patent of the United States is:—

1. The improved method of treating refractory ores which consists in subjecting the same to the action of heat in the presence of air, mixing sulfur therewith (unless there is enough sulfur in the ore) mixing salt therewith, heating the mixture in the presence of air to a degree sufficient to volatilize the metals or other compounds which it is desired to recover, passing the volatilized products into a condenser containing a liquid, intimately mixing said volatile products with said liquid and with air, causing the liquid to repeatedly pass through the condenser, allowing the excess of air to escape from said liquid during its passage, cooling the liquid at one period of its passage through a part of said condenser, collecting the solid products deposited in said liquid, and treating the liquid and solid products to obtain the metals, lead, copper, silver, and gold in the usual way, substantially as described.

2. The method of treating refractory ores which consists in roasting them, volatilizing certain of the metals contained in the ores or their compounds, intimately mixing the volatilized product with air and water in a condenser, repeatedly circulating said water through the condenser in order to saturate it with the soluble compounds that have been volatilized, allowing the excess of air to escape from said water during its passage through the condenser, cooling the water at one period during its passage through the condenser, and finally separating the solid and liquid products in the condenser from each other and obtaining the metals therefrom in the usual way, substantially as described.

3. The method of treating refractory ores which consists in volatilizing some of the metals contained in the ore or other compounds, intimately mixing the volatilized products with air and water in a condenser, repeatedly circulating water through said condenser, allowing the excess of air to escape from the water during its passage through said condenser, cooling the water one part of the time when it is passing through said condenser, drawing off the solid and liquid products collected in said condenser after the water has been repeatedly passed through the same, and recovering the metals from the solid and liquid products in the usual way, substantially as described.

4. In the treatment of refractory ores, the step of obtaining volatilized products which consists in roasting said ore in the presence of air, adding salt thereto, heating and stirring said mixture under the influence of air, and passing the volatilized products into a condenser containing a liquid, intimately mixing said products with said liquid and with air, and finally collecting the products and treating the same to recover the metals, substantially as described.

5. In the treatment of refractory ores, the step of obtaining volatilized products which consists in roasting said ore in the presence of air, adding salt and sulfur thereto, heating and stirring said mixture under the influence of air, and passing the volatilized products into a condenser containing a liquid, intimately mixing said products with said liquid and with air, and finally collecting the products and treating the same to recover the metals, substantially as described.

6. The method of treating ores, which consists in roasting them, volatilizing certain of the metals contained in the ores or their compounds, subjecting the volatilized product to a preliminary cooling, intimately mixing said product with air and water in a condenser, repeatedly circulating said water through said condenser in order to saturate it, and finally separating the solid and liquid product in the condenser from each other and obtaining the metals therefrom in the usual way, substantially as described.

7. In the treatment of refractory ores, the step of obtaining volatilized products which consists in roasting said ore in the presence of air, adding salt and sulfur thereto, and heating and stirring said mixture under the influence of air, substantially as described.

In testimony whereof, I affix my signature, in presence of two witnesses.

HASCAL A. HOGEL.

Witnesses:
S. M. PAULING,
L. F. DAVIES.